United States Patent
Murai et al.

(10) Patent No.: US 9,274,526 B2
(45) Date of Patent: Mar. 1, 2016

(54) AUTONOMOUS VEHICLE AND METHOD OF ESTIMATING SELF POSITION OF AUTONOMOUS VEHICLE

(71) Applicant: Panasonic Corporation, Osaka (JP)

(72) Inventors: Ryosuke Murai, Osaka (JP); Tatsuo Sakai, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 32 days.

(21) Appl. No.: 14/228,511

(22) Filed: Mar. 28, 2014

(65) Prior Publication Data

US 2014/0297093 A1  Oct. 2, 2014

(30) Foreign Application Priority Data

Apr. 2, 2013  (JP) ................................. 2013-076565
Feb. 17, 2014  (JP) ................................. 2014-027900

(51) Int. Cl.
G01C 22/00 (2006.01)
G05D 1/02 (2006.01)
G01C 21/20 (2006.01)
G01C 21/32 (2006.01)

(52) U.S. Cl.
CPC .............. G05D 1/0274 (2013.01); G01C 21/20 (2013.01); G01C 21/32 (2013.01); G05D 1/024 (2013.01); G05D 1/0272 (2013.01); G05D 2201/0206 (2013.01)

(58) Field of Classification Search
CPC ..... G05D 1/024; G05D 1/0274; G01C 21/20; G01C 21/32
See application file for complete search history.

(56) References Cited

U.S. PATENT DOCUMENTS

| 4,852,677 | A | * | 8/1989 | Okazaki ........................ 180/169 |
| 5,764,014 | A | * | 6/1998 | Jakeway et al. ............... 318/587 |
| 7,263,412 | B2 | | 8/2007 | Gutmann et al. |
| 2004/0249504 | A1 | | 12/2004 | Gutmann et al. |
| 2005/0216126 | A1 | * | 9/2005 | Koselka et al. ............... 700/259 |
| 2006/0165276 | A1 | | 7/2006 | Hong et al. |
| 2007/0118248 | A1 | | 5/2007 | Lee et al. |
| 2008/0033645 | A1 | * | 2/2008 | Levinson et al. ............. 701/213 |
| 2009/0190798 | A1 | * | 7/2009 | Lee et al. ..................... 382/103 |

(Continued)

FOREIGN PATENT DOCUMENTS

| JP | 2003-166824 | 6/2003 |
| JP | 2004-5593 | 1/2004 |

(Continued)

*Primary Examiner* — Calvin Cheung
(74) *Attorney, Agent, or Firm* — Wenderoth, Lind & Ponack, L.L.P.

(57) ABSTRACT

An autonomous vehicle includes: a first sensor which obtains environmental information on surrounding environment of the autonomous vehicle; and a control unit which controls a drive unit based on a self position. The control unit includes: a first estimation unit which calculates a first estimate value indicating an estimated self position, by estimation using a probabilistic method based on the environmental information; and a second estimation unit which calculates a second estimate value indicating an estimated self position, by estimation using a matching method based on the environmental information, and the control unit changes, according to the first estimate value, a second estimate range for the calculating of the second estimate value by the second estimation unit, and controls the drive unit using the second estimate value as the self position.

14 Claims, 9 Drawing Sheets

(56) References Cited

U.S. PATENT DOCUMENTS

| | | | |
|---|---|---|---|
| 2010/0106356 A1* | 4/2010 | Trepagnier et al. | 701/25 |
| 2011/0040427 A1* | 2/2011 | Ben-Tzvi | 701/2 |
| 2012/0029698 A1 | 2/2012 | Myeong et al. | |
| 2012/0197477 A1* | 8/2012 | Colwell | 701/25 |
| 2012/0321423 A1* | 12/2012 | MacKnight et al. | 414/664 |
| 2013/0211656 A1* | 8/2013 | An et al. | 701/25 |
| 2013/0238181 A1* | 9/2013 | James | 701/23 |
| 2014/0058611 A1* | 2/2014 | Borinato | 701/23 |
| 2014/0129027 A1* | 5/2014 | Schnittman, Mark | 700/253 |
| 2014/0244038 A1* | 8/2014 | Karlsson et al. | 700/253 |

FOREIGN PATENT DOCUMENTS

| | | |
|---|---|---|
| JP | 2006-209770 | 8/2006 |
| JP | 2008-234350 | 10/2008 |
| JP | 2011-248648 | 12/2011 |

\* cited by examiner

AUTONOMOUS VEHICLE AND METHOD OF ESTIMATING SELF POSITION OF AUTONOMOUS VEHICLE

CROSS REFERENCE TO RELATED APPLICATIONS

The present application is based on and claims priority of Japanese Patent Application No. 2013-076565 filed on Apr. 2, 2013 and Japanese Patent Application No. 2014-027900 filed on Feb. 17, 2014. The entire disclosures of the above-identified applications, including the specifications, drawings and claims are incorporated herein by reference in their entirety.

BACKGROUND OF THE INVENTION

1. Technical Field

The present invention relates to an autonomous vehicle which autonomously moves to a destination, and also relates to a method of estimating self positions of an autonomous vehicle.

2. Description of the Related Art

A conventional autonomous vehicle includes an environmental information obtainment sensor and a control unit. The environmental information obtainment sensor obtains information on surrounding environment of the autonomous vehicle. The control unit controls a drive unit which allows the autonomous vehicle to travel. The control unit includes a self position estimation unit. The self position estimation unit calculates an error of an estimated self position and corrects the estimated self position by comparison of map information stored in a memory unit and environmental information obtained by the environmental information obtainment sensor. The conventional self position estimation unit expands a range of an estimable self position when the self conventional position estimation unit cannot obtain environmental information for use in correction of an error of an estimated self position. The error of an estimated self position is a discrepancy between an actual self position and an estimated self position (see Japanese Unexamined Patent Application Publication No. 2004-5593, for example).

SUMMARY OF THE INVENTION

1. Technical Problem

The conventional autonomous vehicle changes the range of an estimable self position regardless of the error of an estimated a self position. For example, the conventional autonomous vehicle may expand the range of an estimable self position even when the error of an estimated self position is small. This may decrease reliability of a result of self position estimation by the autonomous vehicle. Conceived to address the problem, the present invention has an object of providing an autonomous vehicle capable of estimating of self positions with high reliability.

2. Solution to the Problem

In order to achieve the object, an autonomous vehicle according to the present invention is provided which includes: a first sensor which obtains environmental information on surrounding environment of the autonomous vehicle; and a control unit configured to control a drive unit based on a self position, wherein the control unit includes: a first estimation unit configured to calculate a first estimate value indicating an estimated self position, by estimation using a probabilistic method based on the environmental information; and a second estimation unit configured to calculate a second estimate value indicating an estimated self position, by estimation using a matching method based on the environmental information, and the control unit is configured to: change, according to the first estimate value, a second estimate range for the calculating of the second estimate value by the second estimation unit; and control the drive unit using the second estimate value as the self position.

3. Advantageous Effects

The autonomous vehicle according to the present invention is capable of estimation of self positions with high reliability.

BRIEF DESCRIPTION OF THE DRAWINGS

These and other objects, advantages and features of the invention will become apparent from the following description thereof taken in conjunction with the accompanying drawings that illustrate a specific embodiment of the present invention.

DETAILED DESCRIPTION OF THE INVENTION

Embodiment 1

Figure 1:
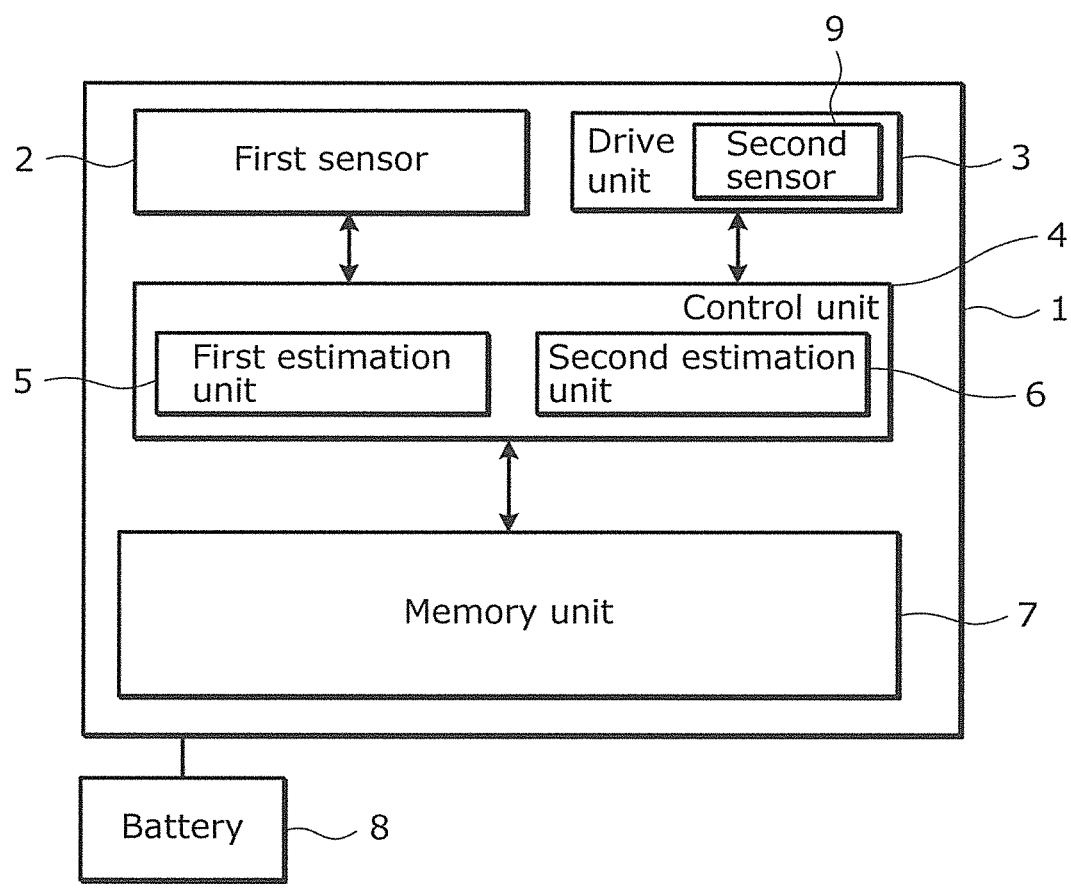
FIG. 1 is a block diagram generally illustrating an autonomous vehicle according to Embodiment 1 of the present invention.

The following describes an autonomous vehicle 1 according to embodiments of the present invention using a general block diagram in FIG. 1. The general block diagram in FIG. 1 is common to all embodiments of the present invention, and therefore is referred to as necessary in the description of each of the embodiments.

Embodiment 1

FIG. 1 to FIG. 5 illustrate Embodiment 1.

The autonomous vehicle 1 autonomously travels while obtaining environmental information which indicates positions of environmental objects around the autonomous vehicle 1. Examples of the environmental objects around the autonomous vehicle 1 include walls present around the autonomous vehicle 1. The autonomous vehicle 1 includes a first sensor 2, a control unit 4, and a memory unit 7 as shown in FIG. 1.

The control unit 4 controls a drive unit 3 based on environmental information obtained by the first sensor 2 to allow the autonomous vehicle 1 to travel. The control unit 4 further includes a first estimation unit 5 and a second estimation unit 6 for estimation of self positions. The control unit 4 is implemented by, for example, software executed on a computer. Then, the control unit 4 corrects self position information using, as its self position, a second estimate value obtained as a result of estimation by the second estimation unit 6.

The first estimation unit 5 estimates a self position based on a probabilistic method using environmental information. Examples of the probabilistic method include a method based on a Bayesian theory. In Embodiment 1, the first estimation unit 5 uses a particle filter as the probabilistic method. In estimation of a self position using a particle filter, the self position is represented by distribution of a set of samples referred to as particles. A self position is estimated through estimation, update, resampling of the particles, and so on.

The second estimation unit 6 estimates a self position based on a method different from that of the first estimation unit 5, while using environmental information. The second estimation unit 6 in Embodiment 1 estimates a self position by performing line matching using a line segment extracted from environmental information. The second estimation unit 6 extracts a line segment from objects, such as a wall, in environmental information, and performs line matching by comparing the extracted line segment and a line segment included in map information to estimate a self position of the autonomous vehicle 1. The line matching in Embodiment 1 is an example of a matching method. Line matching compares a line based on environmental information obtained by the first sensor 2 and a line included in map information. The matching method applicable to Embodiment 1 is not limited to the line matching. For example, a method which involves use of a landmark for position recognition is also applicable.

Self position information including a first estimate value and a second estimate value obtained by the first estimation unit 5 and the second estimation unit 6 is stored in the memory unit 7 and referenced as necessary by the control unit 4 and some other constituent elements.

The memory unit 7 stores data including environmental information obtained by the first sensor 2. The data stored in the memory unit 7 includes self position information, map information, and control parameters as well as the environmental information. The self position information includes the first estimate value estimated by the first estimation unit 5 and the second estimate value estimated by the second estimation unit 6. The memory unit 7 may be a medium or a device which magnetically, electrically, or optically stores information. Examples of the medium and device include a hard disk drive and a flash memory.

The first sensor 2 obtains environmental information which indicates, for example, the position and direction of an environmental object around the autonomous vehicle 1. The first sensor 2 is an environmental information obtainment sensor, for example. The first sensor 2 is implemented using a lidar which horizontally scans a traveling surface ahead of the autonomous vehicle 1, for example. The first sensor 2 is provided at the lower center of the front of the body of the autonomous vehicle 1, for example. The lidar is a sensor which scans a surface using a laser beam swinging back and forth at a certain angle in the surface to be scanned, and thereby measures the distance and angle (direction) of environmental objects. For example, the first sensor 2 performs such scanning intermittently at a controlled regular interval, and stores, in the memory unit 7, a collection of data including distances and angles measured in a stroke of scanning as environmental information (sensor information) at the time of the scanning.

The first sensor 2 is not limited to a device including a lidar. An ultrasound sensor or an infrared sensor provided to measure the distance and angle of environmental objects may also be used as the first sensor 2. A photogrammetric sensor which processes a captured image to measure the distance to environmental objects may also be used as the first sensor 2. The first sensor 2 may also be composed of two or more types of sensors.

The drive unit 3 is a drive device which allows the autonomous vehicle 1 to travel. The drive unit 3 includes a motor driven by a battery 8 and a driving wheel, for example. The drive unit 3 includes a second sensor 9 for calculation of travel information. The travel information includes items such as travel distance and travel direction of the autonomous vehicle 1. The second sensor 9 is a rotary encoder which measures the number of revolutions and revolution speed of the motor, for example.

In Embodiment 1, first, the control unit 4 obtains a travel distance and a travel direction of the autonomous vehicle 1 calculated by the second sensor 9 to calculate relative self position information. The relative self position information includes information on relative position of the autonomous vehicle 1 in a coordinate system based on a reference position. The reference position is a position where the autonomous vehicle 1 is turned on, for example. The relative position is a self position relative to the reference position. The autonomous vehicle 1 in Embodiment 1 autonomously travels using dead reckoning based on the reference position with the self position information.

The control unit 4 in Embodiment 1 has a feature that limits an estimate range (second estimate range 11) for calculation of a second estimate value by the second estimation unit 6, according to a first estimate value estimated by the first estimation unit 5. The estimate range is, for example, a range for line matching by the second estimation unit 6, and is described later as a second estimate range 11. To limit an estimate range is to limit the second estimate range 11. It should be noted that the limiting of an estimate range is an example of changing of an estimate range. The second estimate range 11 is an estimate range for calculation of a second estimate value by the second estimation unit 6, and also is a matching range.

As described above, the autonomous vehicle 1 according to Embodiment 1 has a feature that the control unit 4 includes the first estimation unit 5 which estimates a self position using a probabilistic method and a second estimation unit 6 which estimates a self position using a matching method. The autonomous vehicle 1 according to Embodiment 1 further has a feature that the second estimate range 11 is limited according to a first estimate value estimated by the first estimation unit 5.

By limiting the second estimate range 11 according to a first estimate value, the autonomous vehicle 1 according to Embodiment 1 appropriately limits the estimate range for the calculation of a second estimate value by the second estimation unit 6. For example, when an error of an estimated self position is large, the second estimate range 11 is expanded to increase the probability of correct matching, so that reliability of matching is increased. When an error of an estimated self position is small, the second estimate range 11 is reduced to decrease the probability of incorrect matching, so that correction of an estimated self position can be performed with higher accuracy. Here, an error of an estimated self position is a difference between an actual position and orientation of the autonomous vehicle 1 and the position and orientation of the autonomous vehicle 1 estimated by the control unit 4 (discrepancy in position and orientation). In this manner, the autonomous vehicle 1 according to Embodiment 1 quickly estimates a self position with high reliability, and thereby travels adequately.

Figure 2:
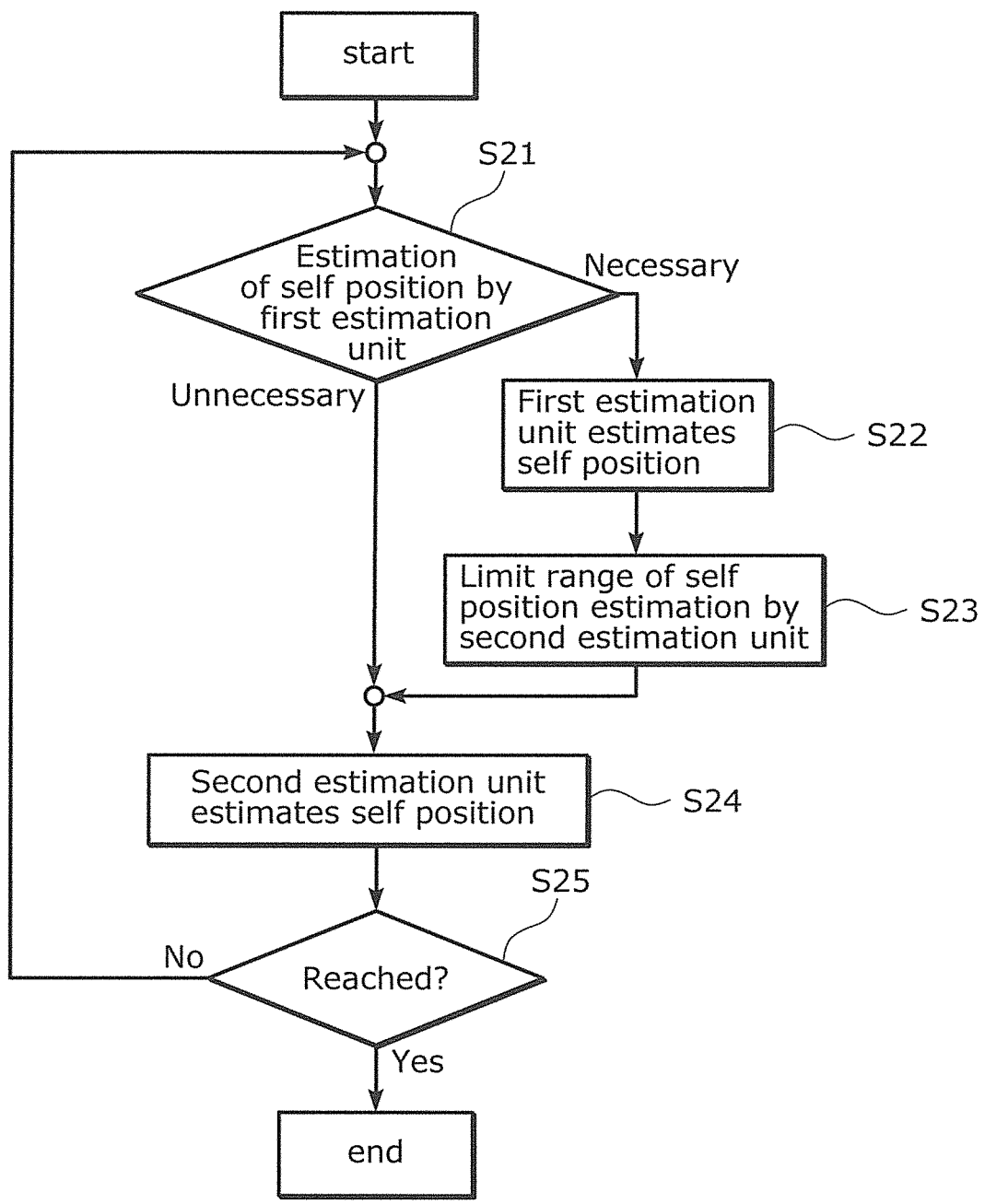
FIG. 2 is a flowchart illustrating a method of estimating a self position according to Embodiment 1 of the present invention.

The following describes a method of estimating a self position of the autonomous vehicle 1 according Embodiment 1 using FIG. 2.

First, the control unit 4 determines whether or not estimation of a self position by the first estimation unit 5 is necessary (Step S21).

When the control unit 4 determines that estimation of a self position by the first estimation unit 5 is necessary (S21, necessary), the control unit 4 causes the first estimation unit 5 to estimate a self position and calculate a first estimate value within a first estimate range 10 (Step S22). The first estimate range 10 will be described later. In Embodiment 1, the first estimate value is calculated using a probabilistic method which involves a particle filter. Next, the control unit 4 limits a second estimate range 11 (a range of estimation by the second estimation unit 6) according to the first estimate value (Step 23). More specifically, the control unit 4 limits the second estimate range 11 based on the first estimate value indicating the estimate range of the particle filter. The estimate range of the particle filter is the spread (spatial spread) of particles. More specifically, in Embodiment 1, when the first estimate value (the estimate range of the particle filter) is smaller than a first threshold value, the second estimate range 11 (matching range) is reduced, and when the first estimate value is larger than a second threshold value, the second estimate range 11 (matching range) is expanded.

Next, the second estimation unit 6 estimates a self position using a matching method within the limited second estimate range 11 (Step S24).

When the control unit 4 determines in the conditional branching in Step S21 that estimation of a self position by the first estimation unit 5 is not necessary (S21, unnecessary), Step S22 and Step S23 are skipped, and the process directly proceeds to Step S24, in which the second estimation unit 6 estimates a self position.

Subsequently, the control unit 4 determines whether or not estimation of a self position is completed (Step S25). Step S21 to Step S24 are repeated until the control unit 4 determines that the autonomous vehicle 1 reaches the target position (Step S25, Yes).

As described above, a method of estimating a self position according to Embodiment 1 has a feature that when the second estimation unit 6 calculates a second estimate value using a matching method after the first estimation unit 5 calculates a first estimate value using a probabilistic method, the control unit 4 limits the second estimate range 11 according to the first estimate value.

A self position is thus estimated, and then the estimated self position is corrected. This enables the autonomous vehicle 1 to travel using a self position highly accurate.

The first estimate value includes information on coordinates and orientation (angle) estimated as a self position of the autonomous vehicle 1 and a value indicating spread (variance and covariance). The second estimate value includes information on coordinates and orientation (angle) estimated as a self position of the autonomous vehicle 1. The line segment in Embodiment 1 means a line segment extracted from environmental information obtained by the first sensor 2 and having a certain length or longer or a line segment included in map information and having a certain length or longer. Examples of the line segment in two-dimensional map information include a line segment representing a wall. In environmental information obtained by a lidar performing horizontal scan, information indicating an existing wall based on a result of the scanning is represented by a line segment.

It should be noted that in Embodiment 1, the term "line segment" means not only a straight line but also a curve.

In Step S21, at least one of the following six criteria, Criteria 1 to 6, may be selected and used as a criterion for the determination as to the necessity.

Criterion 1: It is always determined "Necessary" in Step S21. When Criterion 1 is selected and used, computation load is heavy, but the autonomous vehicle 1 travels using highly accurate self positions throughout its travelling.

Criterion 2: It is determined "Necessary" in Step S21 after every predetermined number of cycles of steps in the cyclic process performed by the autonomous vehicle 1. For example, it may be determined "Necessary" in Step S21 after Step S24 is performed every three times. In other words, under this criterion, estimation of a first estimate value is performed after every predetermined times of calculation of a second estimate value. When Criterion 2 is selected and used, the autonomous vehicle 1 travels with a balance between processing speed and accuracy in self position estimation. For example, probabilistic methods such as the particle filter used in Embodiment 1 generally require heavy computation. Thus, Criterion 2 is used to purposefully reduce the number of processing, so that control performed by the control unit 4 is less likely to take a time longer than the period of the process cycle.

Criterion 3: It is determined "Necessary" in Step S21 only when a match rate resulting from a matching method performed by the second estimation unit in the previous cycle is evaluated as being lower than or equal to a predetermined value. Criterion 3 is used effectively especially when a path of the autonomous vehicle 1 is simple in shape. For example, when the path is straight and the match rate in the previous cycle of matching is adequately high, the match rate is less likely to drop. When Criterion 3 is used for such a simple path, the autonomous vehicle 1 travels with a balance between processing speed and accuracy in self position estimation.

Criterion 4: It is determined "Necessary" in Step S21 while the autonomous vehicle 1 is travelling in a first region, and determined "Unnecessary" in Step S21 while the autonomous vehicle 1 is travelling in a second region (the first region and the second region are previously determined in map information). The first region may be a region where the path is simple in shape, such as a straight path. The second region may be a region where the path is complicated in shape, such as an area near a front desk of a building or an intersection of paths.

Criterion 5: It is determined "Necessary" in Step S21 only in predetermined time of day. The predetermined time of day is, for example, late night hours.

Criterion 6: It is determined "Necessary" in Step S21 according to a type of a package being carried by the autonomous vehicle 1. Under Criterion 6, for example, it is determined "Necessary" in Step S21 only when the autonomous vehicle 1 is carrying a fragile package. Criterion 6 is used effectively especially when a fragile package is being carried, because an error in estimation of a self position may increase the probability of contacting with objects such as a wall.

Figure 3:
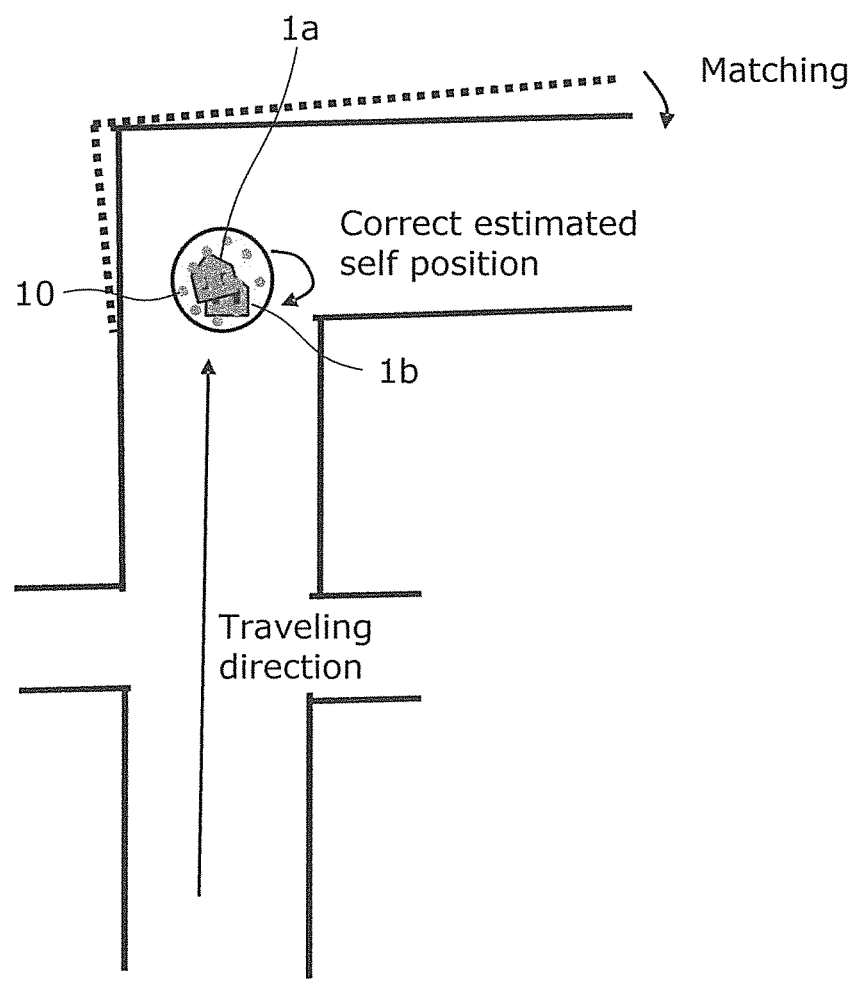
FIG. 3 illustrates a feature of the autonomous vehicle according to Embodiment 1 of the present invention.
Figure 4:
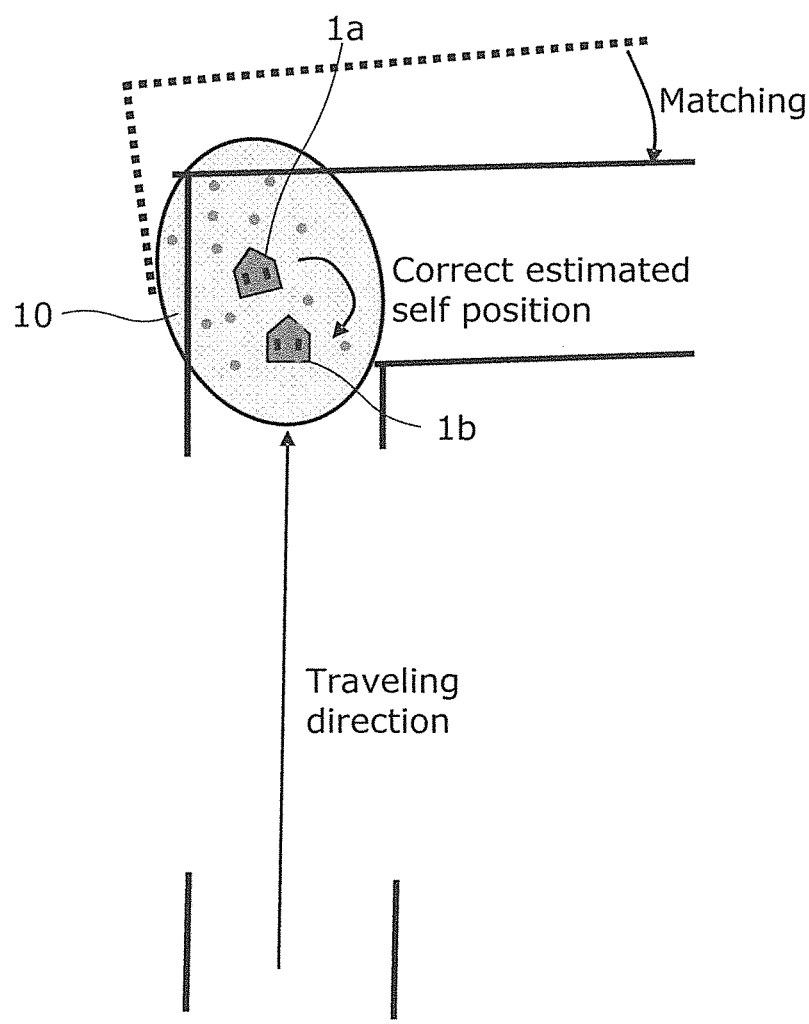
FIG. 4 illustrates a feature of the autonomous vehicle according to Embodiment 1 of the present invention.

The following describes a method of estimating a self position according Embodiment 1 using FIG. 3 and FIG. 4. In FIG. 3 and FIG. 4, the solid lines represent where walls are present, and the dotted lines represent line segments extracted from environmental information using an estimated self position as a reference. One diagram of the autonomous vehicle 1 in each of FIG. 3 and FIG. 4 represents a first self position 1*a* of the autonomous vehicle 1, and the other represents a second self position 1*b* of the autonomous vehicle 1 as a result of correction based on environmental information. The first self position 1*a* is a self position which the autonomous vehicle 1 traveling in a traveling direction has estimated using dead reckoning. The second self position 1*b* is a self position as a result of correction based on environmental information using a method of estimating a self position according Embodiment 1. The dots present around the diagrams of the autonomous vehicle 1 in FIG. 3 and FIG. 4 represent particles distributed in a first estimate range 10 and each represent an estimated self position. The first estimate range 10 represents an estimate range of a particle filter, and is an example of the first estimate value.

A comparison of FIG. 3 and FIG. 4 clearly shows that both the first estimate range 10 and the discrepancy of the line segments between the environmental information and the map information in FIG. 3 are smaller. It also shows that both the first estimate range 10 and the matching discrepancy in FIG. 4 are larger. It is therefore understood that changing a range of estimable matching discrepancy (the second estimate range 11 of the second estimation unit 6) according to the size of the first estimate range as in Embodiment 1 produces an advantageous effect.

The method of estimating the first estimate value is performed using a particle filter in this example, and thus the first estimate value indicates spread of the distribution of coordinates of multiple estimated particles.

Figure 5:
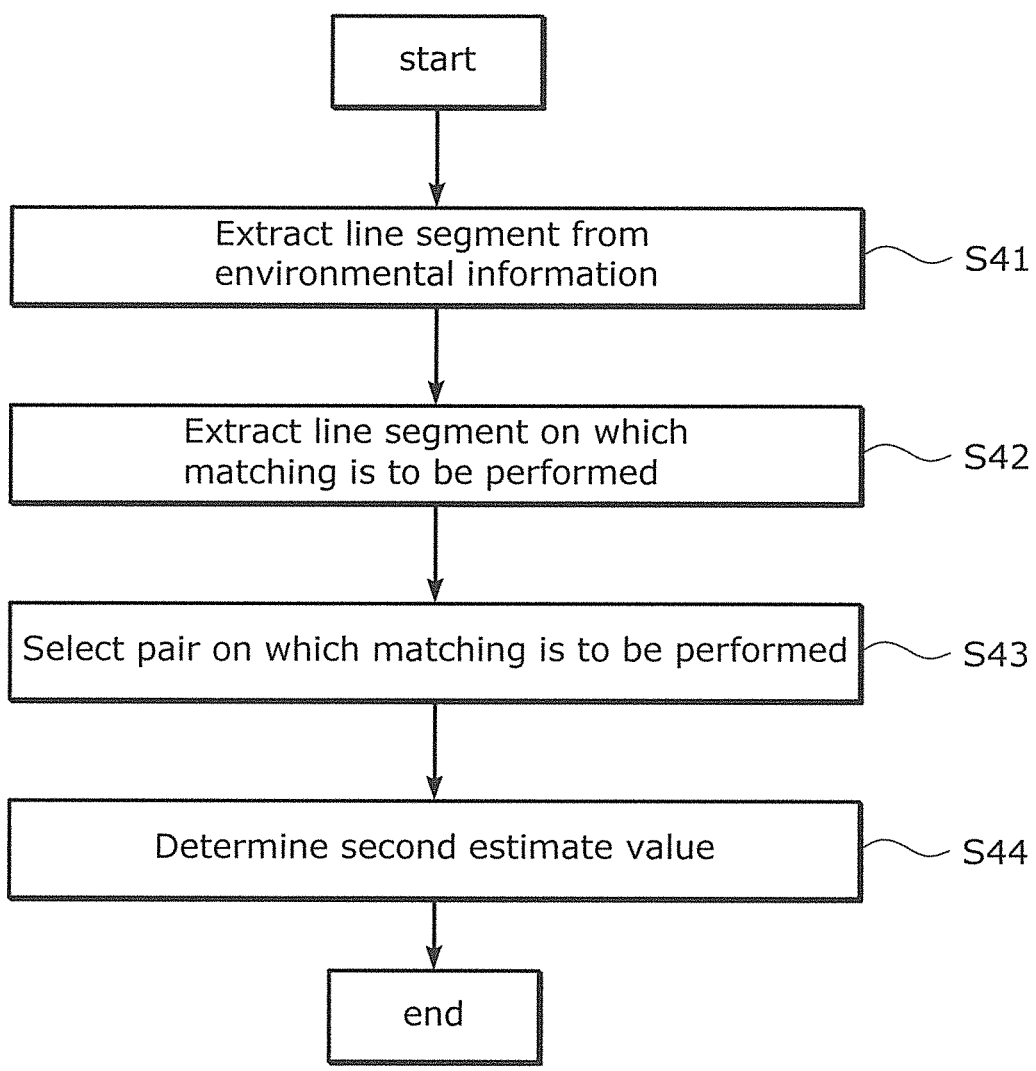
FIG. 5 is a flowchart illustrating a method of line matching according to Embodiment 1 of the present invention.

The following describes the matching method (Step 24 in FIG. 2) using which the second estimation unit 6 estimates a self position according to Embodiment 1, using a flowchart in FIG. 5, FIG. 1, and FIG. 2.

First, line segments in environmental information are extracted from environmental information stored in the memory unit 7 (Step S41). Next, line segments in map information are extracted as targets of matching from self position information and map information stored in the memory unit 7 (Step S42). Next, within a predetermined range, a line segment in the environmental information and a line segment in the map information are selected as a pair on which matching is to be performed (Step S43). Next, matching is performed on the selected pair, and a second estimate value is determined as a result of estimation a self position of the autonomous vehicle 1 (Step S44).

The predetermined range in Step S43 is a range limited according to a first estimate value as described above, when it is determined "Necessary" in Step S21 shown in FIG. 2.

The probabilistic method for use in Embodiment 1 includes but not limited to the above-mentioned particle filter. Examples of the probabilistic method applicable to Embodiment 1 include position estimation using probabilistic occupancy grid and the Kalman filter.

Optionally, when the difference between the first estimate value estimated by the first estimation unit 5 and the second estimate value estimated by the second estimation unit 6 in the above-described method of estimating a self position is larger than a third threshold value, an estimated self position may be corrected based on the first estimate value so that a second self position 1*b* is used as the current self position.

Optionally, the autonomous vehicle 1 may further include a notification unit which gives a notification of an error in estimation of a self position when the difference between the first estimate value estimated by the first estimation unit 5 and the second estimate value estimated by the second estimation unit 6 in the above-described method of estimating a self position is greater than a fourth threshold value.

Optionally, when the difference between the first estimate value estimated by the first estimation unit 5 and the second estimate value estimated by the second estimation unit 6 in the above-described method of estimating a self position is greater than a fifth threshold value, and the matching rate evaluated by the second estimation unit 6 is lower than a sixth threshold value, the control unit 4 may correct an estimated self position based on the first estimate value so that a second self position 1*b* is used as the current self position. In this configuration, a large error in estimation of a self position by the second estimation unit 6 may be resolved.

Optionally, in the above-described method of estimating a self position, a first estimate value may be initialized to the second self position 1*b* after every predetermined number of cycles. This initialization allows handling of problems such as accumulation of errors.

The length of a line segment for use in estimation of a self position by the second estimation unit 6 need not be a fixed length. For example, the length of the line segment may be variable depending on at least one of (a) regions previously determined in map information and (b) a predetermined branched instruction.

In an exemplary branching, the length of a line segment may be increased when a first estimate value is larger than an eighth threshold value, and the length of a line segment may be decreased when a first estimate value is smaller than an eighth threshold value.

Optionally, for example, the line segment may have a first length while the autonomous vehicle 1 is traveling in a first region, and have a second length, which is longer than the first length, while the autonomous vehicle 1 is traveling in a second region. The first region and the second region are determined previously in map information.

Optionally, in another exemplary branching, the line segment may have a first length in predetermined time of day (for example, late night hours), and have a second length in other time of day. Optionally, in another exemplary branching, the line segment may be a first segment when information indicating that the package the autonomous vehicle 1 is carrying is fragile is input.

Figure 9:
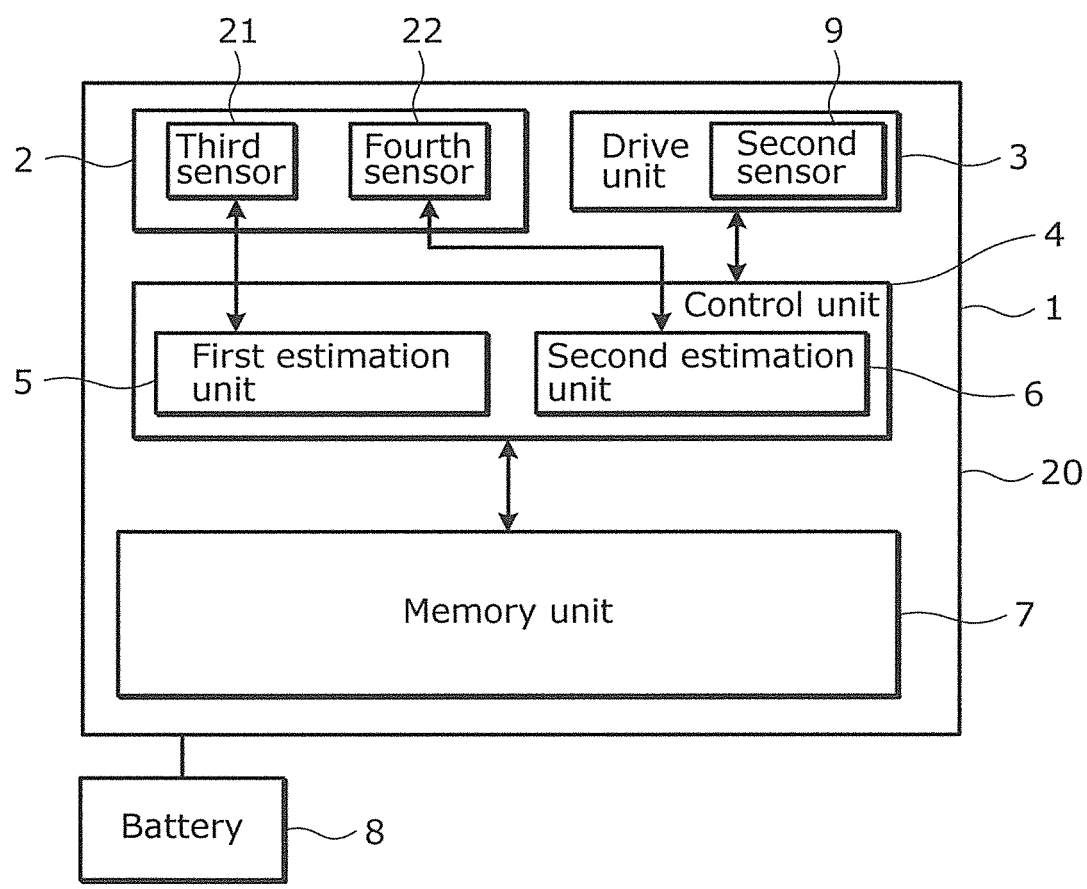
FIG. 9 is a block diagram generally illustrating an autonomous vehicle according to another embodiment of the present invention.

Optionally, the first sensor 2 of an autonomous vehicle 20 may include a third sensor 21 and a fourth sensor 22 as shown in FIG. 9. The third sensor 21 obtains environmental information which is used by the first estimation unit 5, and the fourth sensor 22 obtains environmental information which is used by the second estimation unit 6. In this configuration, for example, the third sensor 21 obtains environmental information appropriate for a probabilistic method, and the fourth sensor 22 obtains environmental information appropriate for extraction of line segments. This enables the autonomous vehicle 20 to travel with higher accuracy.

(Variation 1 of Embodiment 1)

Figure 6:
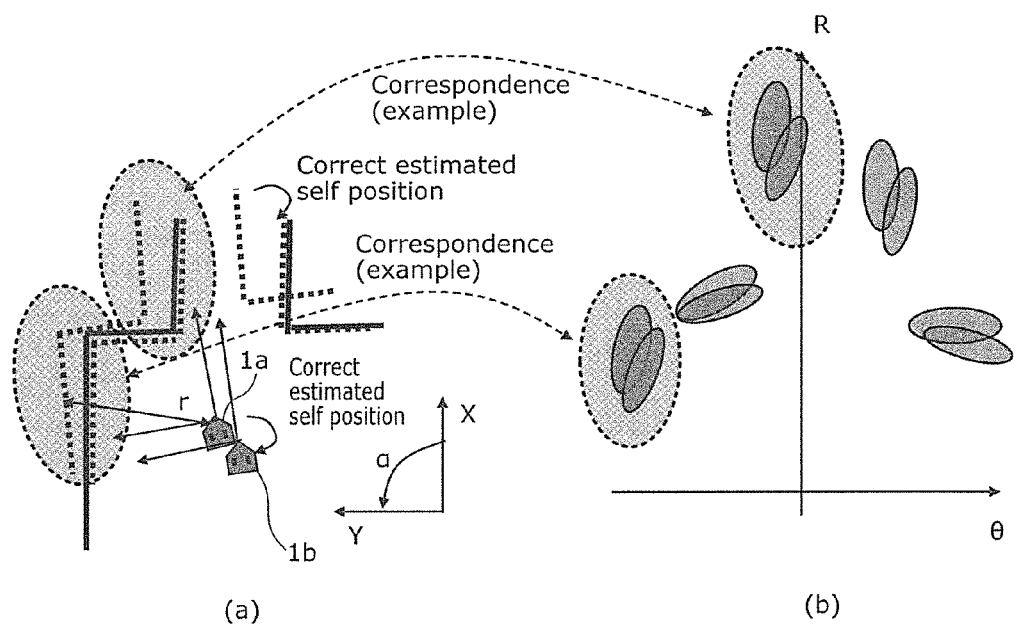
FIG. 6 is a flowchart illustrating an exemplary implementation of the method of line matching according to Variation 1 of Embodiment 1 of the present invention.

The following describes a method of estimating a self position according to Variation 1 of Embodiment 1 of the present invention using FIG. 6.

A feature of Variation 1 of Embodiment 1 is that the Kalman filter is used in the method of estimating a self position by the second estimation unit 6.

The diagram in (a) in FIG. 6 shows a case where five line segments (solid lines) stored as map information in the memory unit 7 and five line segments (dotted lines) extracted from environmental information are present. In the graph in (b) in FIG. 6, the horizontal axis indicates angle (8) indicating the direction of position of line segments with respect to the autonomous vehicle 1, where X and Y coordinates are provided as shown in the diagram in (a), and the vertical axis indicates distance (R) from the autonomous vehicle 1 to line segments. The Kalman filter is executed to estimate a self position using the direction, distance, and probability.

(Variation 2 of Embodiment 1)

Figure 7:
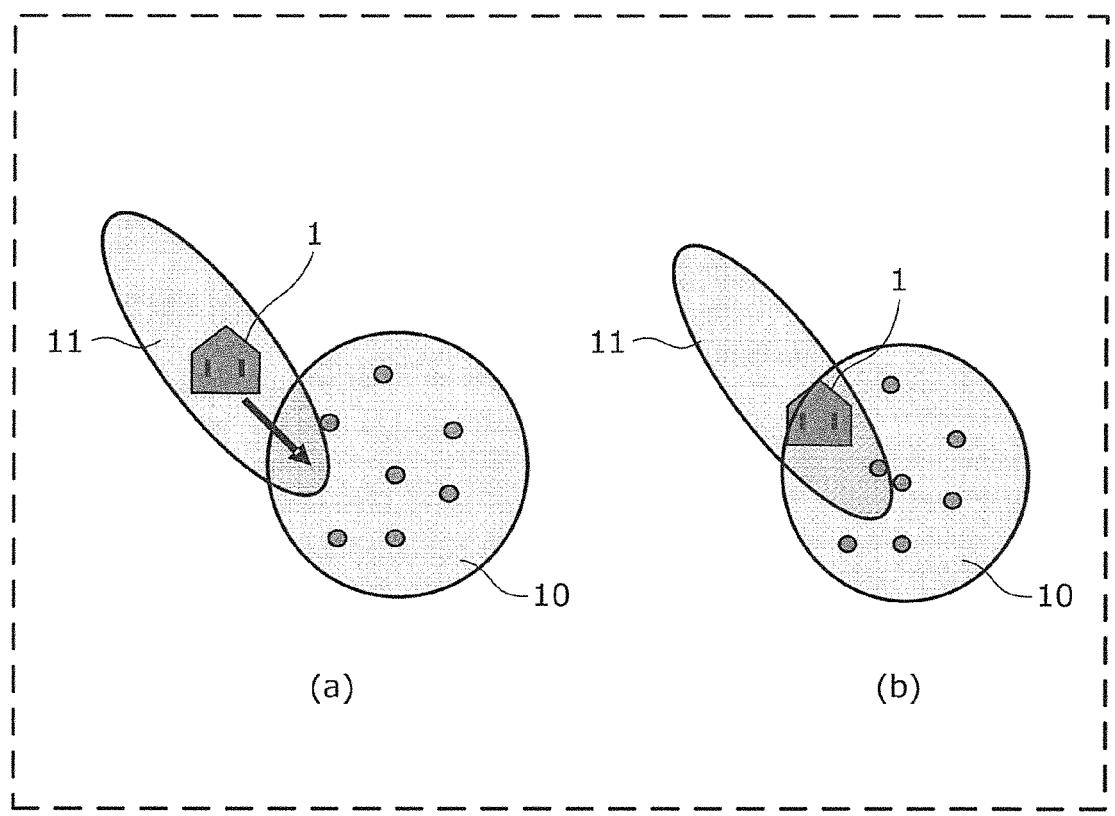
FIG. 7 illustrates a method of estimating a self position according to Variation 2 of Embodiment 1 of the present invention.

The following describes a method of estimating a self position according to Variation 2 of Embodiment 1 of the present invention using FIG. 7.

In FIG. 7, the diagram in (a) and the diagram (b) each show a first estimate range 10 of the first estimation unit 5 and a second estimate range 11 of the second estimation unit 6. In the diagram (b), a self position indicated by a second estimate value is included in the first estimate range 10, and thus the control unit 4 uses the second estimate value as a self position. In the diagram (a), a self position indicated by a second estimate value is not included in the first estimate range 10. In this case, the second estimate value may be incorrect. Thus, the control unit 4 in (a) corrects an estimated self position so that the corrected estimated self position of the autonomous vehicle 1 falls within the first estimate range 10. This method increases stability in move of the autonomous vehicle 1.

(Variation 3 of Embodiment 1)

Figure 8:
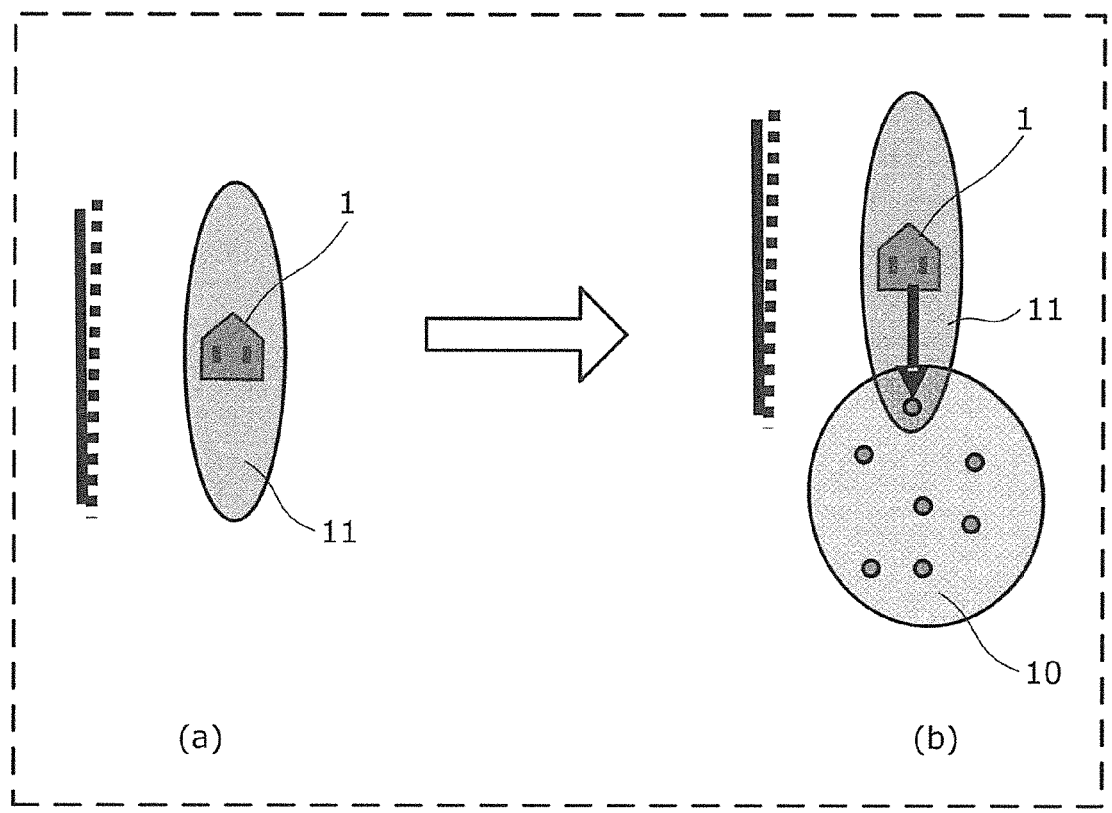
FIG. 8 illustrates a method of estimating a self position according to Variation 3 of Embodiment 1 of the present invention.

The following describes a method of estimating a self position according to Variation 3 of Embodiment 1 of the present invention using FIG. 8.

In FIG. 8, a line segment is present only in one direction, that is, on the left side of the autonomous vehicle 1 in the diagram, and accuracy of self position estimation by the autonomous vehicle 1 is high only in the direction perpendicular (lateral in the diagram) to the moving direction (upward in the diagram) of the autonomous vehicle 1. The distribution indicated by second estimate values estimated by the second estimation unit 6 (second estimate range 11) stretches along the moving direction of the autonomous vehicle 1. In this case, error of an estimated self position is highly likely to occur even after an estimated self position is corrected using the second estimate values. To address the problem, a self position is estimated only within a first estimate range 10 and the second estimate range 11. This correction of an estimate value increases stability in move of the autonomous vehicle 1.

It is to be noted that present invention is not limited to the present embodiment. For example, in another embodiment of the present invention, the components described in the present description may be optionally combined or omitted. The present invention also includes variations of the embodiments conceived by those skilled in the art unless they depart from the spirit and scope of the present invention, that is, the wording in the claims.

As described above, the autonomous vehicle according to the present invention is capable of traveling with high reliability in estimation of self positions, and is therefore applicable to vehicles for use in buildings, such as a hospital.

The invention claimed is:

1. An autonomous vehicle comprising:
a first sensor which obtains environmental information on surrounding environment of the autonomous vehicle; and
a controller configured to control a driver based on a self position,
wherein the controller includes:
a first estimator configured to calculate a first estimate value indicating an estimated self position, by estimation using a probabilistic method based on the environmental information; and
a second estimator configured to calculate a second estimate value indication an estimated self position, by estimation using a matching method based on the environmental information, and the controller is configured to:
change, according to the first estimate value, a second estimate range for the calculating of the second estimate value by the second estimator;
control the driver using the second estimate value as the self position;
reduce the second estimate range when a first estimate range included in the first estimate value is smaller than a first threshold value; and
expand the second estimate range when the first estimate range is larger than a second threshold value.

2. The autonomous vehicle according to claim 1, wherein the first estimater is configured to estimate a self position using the probabilistic method which involves a particle filter, and
the second estimater is configured to estimate a self position using the matching method which involves line matching.

3. The autonomous vehicle according to claim 1, wherein when a difference between the first estimate value and the second estimate value is larger than a fifth threshold value, and a matching rate of the second estimater is lower than a sixth threshold value, the controller is configured to control the driver using the self position that is based on the first estimate value.

4. The autonomous vehicle according to claim 1, wherein the controller is configured to correct the estimated self position that is based on the second estimate value so that the corrected estimated self position falls within a first estimate range obtained as a result of the estimation of a self position by the first estimater.

5. The autonomous vehicle according to claim 1, wherein the controller is configured to set the first estimate value as the self position at a predetermined interval.

6. The autonomous vehicle according to claim 1, wherein the first estimater is configured to calculate the first estimate value after every predetermined number of times of the calculating of a second estimate value.

7. The autonomous vehicle according to claim 1, wherein the controller is configured to determine, for each region in map information, whether or not the calculating of a first estimate value is necessary.

8. The autonomous vehicle according to claim 1, wherein the controller is configured to determine whether or not the calculating of a first estimate value is necessary according to time of day.

9. The autonomous vehicle according to claim 1, wherein the controller is configured to determine whether or not the calculating of a first estimate value is necessary according to a type of a package being carried by the autonomous vehicle.

10. The autonomous vehicle according to claim 1, wherein the second estimater is configured to change, for each region in map information, a length of a line segment for use in the calculating of a second estimate value.

11. The autonomous vehicle according to claim 1, wherein the second estimater is configured to change, depending on a result of the estimation by the first estimater, a length of a line segment for use in the calculating of a second estimate value.

12. The autonomous vehicle according to claim 1, wherein the first sensor includes: a third sensor which obtains the environmental information to be used by the first estimater; and a fourth sensor which obtains the environmental information to be used by the second estimater.

13. An autonomous vehicle comprising:
a first sensor which obtains environmental information on surrounding environment of the autonomous vehicle; and
a controller configured to control a driver based on a self position,
wherein the controller includes:
- a first estimater configured to calculate a first estimate value indicating an estimated self position, by estimation using a probabilistic method based on the environmental information; and
- a second estimater configured to calculate a second estimate value indicating an estimated self position, by estimation using a matching method based on the environmental information, and the controller is configured to:
- change, according to the first estimate value, a second estimate range for the calculating of the second estimate value by the second estimater; and
- control the driver using the second estimate value as the self position, wherein when a difference between the first estimate value and the second estimate value is larger than a third threshold value, the controller is configured to control the driver using the self position that is based on the first estimate value.

14. An autonomous vehicle comprising:
a first sensor which obtains environmental information on surrounding environment of the autonomous vehicle; and
a controller configured to control a driver based on a self position,
wherein the controller includes:
- a first estimater configured to calculate a first estimate value indicating an estimated self position, by estimation using a probabilistic method based on the environmental information; and
- a second estimater configured to calculate a second estimate value indicating an estimated self position, by estimation using a matching method based on the environmental information, and the controller is configured to:
- change, according to the first estimate value, a second estimate range for the calculating of the second estimate value by the second estimater; and
- control the driver using the second estimate value as the self position, notificator configured to give a notification of an error when a difference between the first estimate value and the second estimate value is larger than a fourth threshold value.

* * * * *